Patented July 1, 1941

2,247,419

UNITED STATES PATENT OFFICE 2,247,419

MONOETHERS OF DIMETHYLOL UREA AND PROCESS FOR MAKING SAME

Ben E. Sorenson, Upper Darby, Pa., assignor to E. I. du Pont de Nemours & Company, Wilmington, Del., a corporation of Delaware No Drawing. Application October 5, 1938, Serial No. 233,509

7 Claims. (Cl. 260—553)

This invention relates to urea-aldehyde derivatives and more particularly to monoethers of dimethylol urea and to a process for preparing them.

The dialkyl ethers of dimethylol urea and the alkyl ethers of monomethylol urea and their preparation are well known. The monoalkyl ethers of dimethylol urea, however, are not easily or readily prepared by the procedures previously described for preparing the other ethers of the methylol ureas. Since the monoalkyl ethers of dimethylol urea possess certain properties which make their practical application desirable, a ready means for their preparation by a commercially economic procedure is of importance.

The invention therefore has as an object the preparation of monoalkyl and monoaryl ethers of dimethylol urea. A further object is the preparation of new and useful urea derivative compounds. Other objects will be apparent as the description of the invention proceeds.

These objects are accomplished by a process which comprises reacting the alkyl or aryl ethers of monomethylol urea with formaldehyde.

The dimethylol urea monoethers of this invention have the general formula:

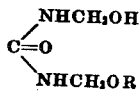

where R represents a univalent hydrocarbon radical.

The following examples will more fully describe the process and products of this invention:

EXAMPLE I

Monomethylol urea methyl ether _____ 52 parts (0.5 mol)
Formalin (37% formaldehyde) _____ 45 parts (0.55 mol)

To the formalin was added 0.5% of monosodium phosphate as a buffer and the liquid then adjusted to a pH of 7.6 with a 10% aqueous solution of sodium hydroxide. The monomethylol urea methyl ether was then added with stirring. The clear solution was then allowed to stand at room temperature (approximately between 68° and 77° F.) for a period of approximately four days (96 hours) after which the crystalline material which had formed was removed by filtration from the mother liquor and from the latter a second crop of crystals was obtained by concentration. The yield based on the monomethylol urea methyl ether used was approximately 60%. The crude material obtained was recrystallized twice from methyl alcohol. The melting point of the recrystallized material was found to be 94°–96° C. Analysis for nitrogen content yielded a result of 21.06%. The calculated nitrogen content of dimethylol urea monomethyl ether is 20.9%.

EXAMPLE II

Dimethylol urea mono-n-butyl ether

Monomethylol n-butyl ether _____ 146 parts (1 mol)
Formalin (37% formaldehyde) _____ 88 parts (1.08 mol)

The formalin was adjusted to a pH of 8.6 with a 10% aqueous solution of sodium hydroxide. The monomethylol urea mono-n-butyl ether was then added and the mass stirred until the solid material was dissolved. The clear liquid was allowed to stand at room temperature for three days (72 hours) after which time the crystals which had formed were separated from the mother liquor by filtration. The crystalline material thus obtained was recrystallized from methyl alcohol. The final product consisted of white granular crystals which had a melting point of 98°–99° C. Nitrogen determination of the white granular crystals showed the product to contain 15.9% nitrogen. The calculated nitrogen content of dimethylol urea mono-n-butyl ether is 15.9%.

EXAMPLE III

Dimethylol urea mono isobutyl ether

Monomethylol urea isobutyl ether _____ 146 parts (1 mol)
Formalin (37% formaldehyde) _____ 90 parts (1.12 mol)

The formalin was adjusted to a pH of 8.7 with a 10% aqueous solution of sodium hydroxide. The monomethylol isobutyl ether was then added and dissolved by stirring the mass. The clear liquid was allowed to stand for three days (72 hours) at room temperature. The liquid was then diluted with about two volumes of diethyl ether and treated with anhydrous sodium sulphate to remove water. The sodium sulphate was then removed by filtration and the diethyl ether removed by concentrating under reduced pressure. A clear viscous syrup resulted which was soluble in water and in alcohols. The yield obtained was 88% of the theoretical. Upon standing for an additional several days the viscous syrup deposited crystals which were removed and recrystallized from methyl alcohol. The melting point of the crystals was found to be 86°–89° C. Nitrogen determination yielded a result of 15.8%. The theoretical nitrogen content of dimethylol urea mono-isobutyl ether is 15.9%. The di-methylol urea mono-isobutyl ether probably exists in isomeric form since on standing for approximately one month the melting point of the crystals obtained as above was found to be 80°–175° C.

The monomethylol urea alkyl and aryl ethers used may be conveniently prepared according to the procedure described and claimed in my co-pending application Serial Number 180,456, filed December 17, 1937 which matured into U. S. Patent 2,201,927 on May 21, 1940. Such a procedure comprises reacting water-wet monomethylol urea with a monohydric alcohol in the presence of an acid catalyst and after the reaction is completed, neutralizing the acid catalyst. The monomethylol ether may then be obtained as a crystalline solid, if desired, by concentrating the solution or by chilling and allowing the crystals to form. Monomethylol urea ethers prepared by any other procedure may also be used in the present invention.

While the examples describe the preparation of dimethylol urea monoalkyl ethers, the mono-aryl ethers, as e. g. the benzyl ether, may also be prepared according to the present procedure. The higher monoalkyl ethers are also readily prepared by the present process.

The formalin may be of any commercially available strength or, if desired, paraformaldehyde may be used, dissolved in water with the aid of a small quantity of alkali or base producing substance as for example hexamethylene tetramine.

The alkalinity of the reaction mixture as used in the examples is pH 7.6, 8.6 and 8.7. This may conveniently range between pH 7.4 and pH 9.0 for the preferred results. The reaction may be carried out at higher pH values but no particular advantages result. Reaction in acid medium is to be avoided.

Preferred results are obtained by carrying out the reaction within a range of room temperatures. Too high temperatures, as for instance above 75° C., are to be avoided. At temperatures substantially below room temperature the reaction proceeds too slowly to be practical.

The products of the present invention are soluble in water and in alcohols. The monoethers of dimethylol urea may be heated with appropriate alcohols to produce resinous solutions. Such solutions are adaptable for use as the vehicle in the preparation of decorative and protective coating compositions for various types of surfaces and may be used with or without pigments, fillers, dyes, plasticizers or modifiers, etc. Coatings of such compositions on being baked produce hard, tough and flexible films which are insoluble in water. The ether solutions as prepared may be used directly as a vehicle for the preparation of coating compositions or the crystalline products may be dissolved or treated in suitable solvents, as previously noted, and used as the vehicle. Such solutions are also valuable as impregnating media for porous materials such as wood, woven or felted fibrous material, leather, fiber board products, etc.

The dimethylol urea mono alkyl and aryl ethers are new compounds and have not previously been described or prepared. Because of their solubility characteristics and the production of water-insoluble, hard, tough, and flexible films when used in coating composition their production has resulted in a desirable advance in the art. The monoethers of dimethylol urea may be further of value in the preparation of mixed ethers of dimethylol urea which cannot be prepared directly by any present known methods.

As many apparently widely different embodiments of this invention may be made without departing from the spirit and scope thereof, it is to be understood that I do not limit myself to the specific embodiments thereof except as defined in the appended claims.

I claim:

1. A monoether of dimethylol urea having the general formula

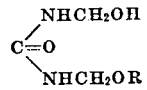

where R represents a univalent hydrocarbon radical joined to the oxygen atom by an acyclic carbon atom.

2. The monoether of dimethylol urea defined in claim 1 in which R is an alkyl radical.

3. The monoether of dimethylol urea defined in claim 1 in which R is a benzyl radical.

4. A process which comprises reacting in alkaline medium formaldehyde and an alkyl ether of monomethylol urea.

5. A process which comprises reacting in alkaline medium formaldehyde and a benzyl ether of monomethylol urea.

6. Dimethylol urea monomethyl ether.

7. Dimethylol urea mono isobutyl ether.

BEN E. SORENSON.